(12) United States Patent
Badaye et al.

(10) Patent No.: US 9,600,125 B2
(45) Date of Patent: Mar. 21, 2017

(54) SENSOR ARRAY WITH EDGE PATTERN

(71) Applicant: Cypress Semiconductor Corporation, San Jose, CA (US)

(72) Inventors: Massoud Badaye, Sunnyvale, CA (US); Peter Vavaroutsos, San Jose, CA (US); Milton Ribeiro, Los Altos, CA (US); Oleksandr Hoshtanar, Lviv (UA)

(73) Assignee: CTPRESS SEMICONDUCTOR CORPORATION, San Jose, CA (US)

( * ) Notice: Subject to any disclaimer, the term of this patent is extended or adjusted under 35 U.S.C. 154(b) by 646 days.

(21) Appl. No.: 13/631,369

(22) Filed: Sep. 28, 2012

(65) Prior Publication Data

US 2014/0022202 A1    Jan. 23, 2014

Related U.S. Application Data

(60) Provisional application No. 61/672,992, filed on Jul. 18, 2012.

(51) Int. Cl.
G06F 3/044 (2006.01)

(52) U.S. Cl.
CPC ................... G06F 3/044 (2013.01)

(58) Field of Classification Search
CPC .......... G06F 3/044; G06F 2203/04112; G06F 2203/04111
USPC ..................... 345/173–179; 178/18.01–18.09
See application file for complete search history.

(56) References Cited

U.S. PATENT DOCUMENTS

| | | |
|---|---|---|
| 5,045,644 A | 9/1991 | Dunthorn |
| 2003/0132920 A1 | 7/2003 | Lee |
| 2005/0184965 A1 | 8/2005 | Geaghan |
| 2007/0222766 A1 | 9/2007 | Bolender |
| 2009/0213082 A1 | 8/2009 | Ku |
| 2010/0079393 A1* | 4/2010 | Dews ............................ 345/173 |
| 2011/0109572 A1 | 5/2011 | Deslippe |
| 2011/0157079 A1* | 6/2011 | Wu et al. ....................... 345/174 |
| 2011/0227858 A1* | 9/2011 | An et al. ........................ 345/174 |

(Continued)

FOREIGN PATENT DOCUMENTS

| | | |
|---|---|---|
| CN | 101882041 A | 11/2010 |
| CN | 102023767 A | 4/2011 |

OTHER PUBLICATIONS

Cameron, A., Touch and Motion [tactile sensor], 1988 IEEE International Conference on Robotics and Automation, Apr. 24-29, 1988, pp. 1062-1067, vol. 2, IEEE Xplore Digital Library, Philadelphia, PA, USA.

(Continued)

Primary Examiner — Premal Patel

(57) ABSTRACT

A capacitive sensor array may include a first set of sensor electrodes and a second set of sensor electrodes. Each of the second set of sensor electrodes may intersect each of the first set of sensor electrodes to form a plurality of unit cells each corresponding to a pair of sensor electrodes including one of the first set of sensor electrodes and one of the second set of sensor electrodes. Each point within each of the plurality of unit cells may nearer to a gap between the pair of sensor electrodes corresponding to the unit cell than to a gap between any different pair of sensor electrodes, and a first trace pattern within a first unit cell of the plurality of unit cells may be different from a second trace pattern within an adjacent unit cell of the plurality of unit cells.

24 Claims, 16 Drawing Sheets

(56) References Cited

U.S. PATENT DOCUMENTS

| | | |
|---|---|---|
| 2012/0050214 A1 | 3/2012 | Kremin et al. |
| 2012/0127118 A1 | 5/2012 | Nolting |
| 2012/0212449 A1 | 8/2012 | Kuriki |
| 2013/0207911 A1 | 8/2013 | Barton et al. |
| 2013/0221991 A1 | 8/2013 | Campbell |
| 2013/0285975 A1 | 10/2013 | Hong et al. |

OTHER PUBLICATIONS

Enhanced AccuTouch Technology Specifications, elo Touch Solutions, Jul. 2012, [retrieved on Sep. 27, 2012]. Retrieved from the Internet <URL:http://www.elotouch.com/products/touchscreens/accutouch/enhanced_accutouch_specifications.pdf>.

Barna, L., The Use of Electromechanical Film (EMFi) Sensors in Building a Robust Touch-Sensistive Tablet-Like Interface, Sensors Journal, IEEE, Jan. 2007, pp. 74-80, vol. 1, IEEE Xplore Digital Library.

International Search Report for International Application No. PCT/US12/71060 dated Jan. 25, 2013; 5 pages.

USPTO Non-Final Rejection for U.S. Appl. No. 14/097,126 dated Jan. 31, 2014; 14 pages.

Written Opinion of the International Searching Authority for International Application No. PCT/US12/71060 mailed Jan. 25, 2013; 3 pages.

\* cited by examiner

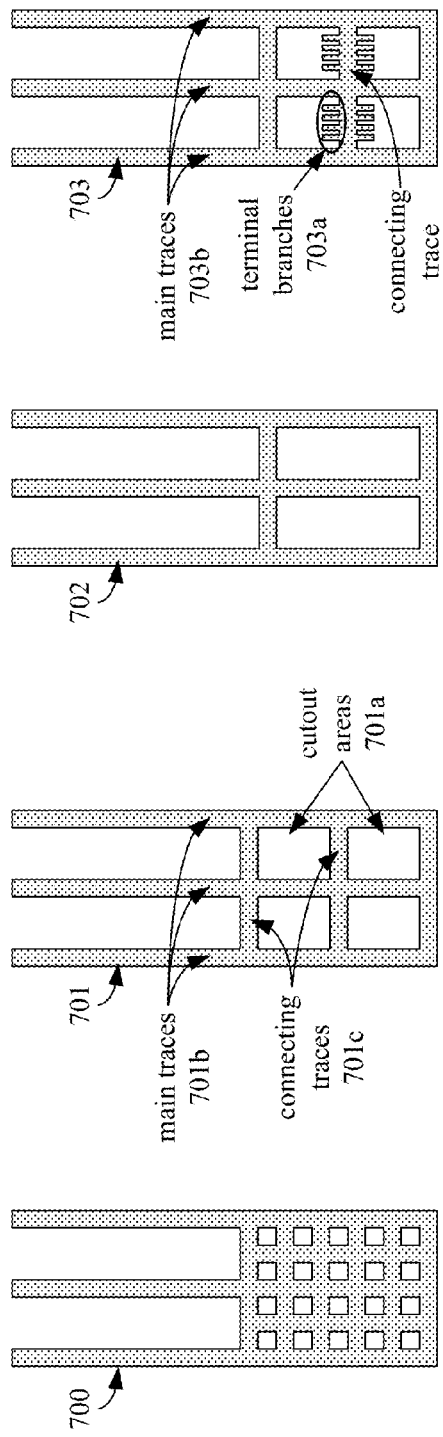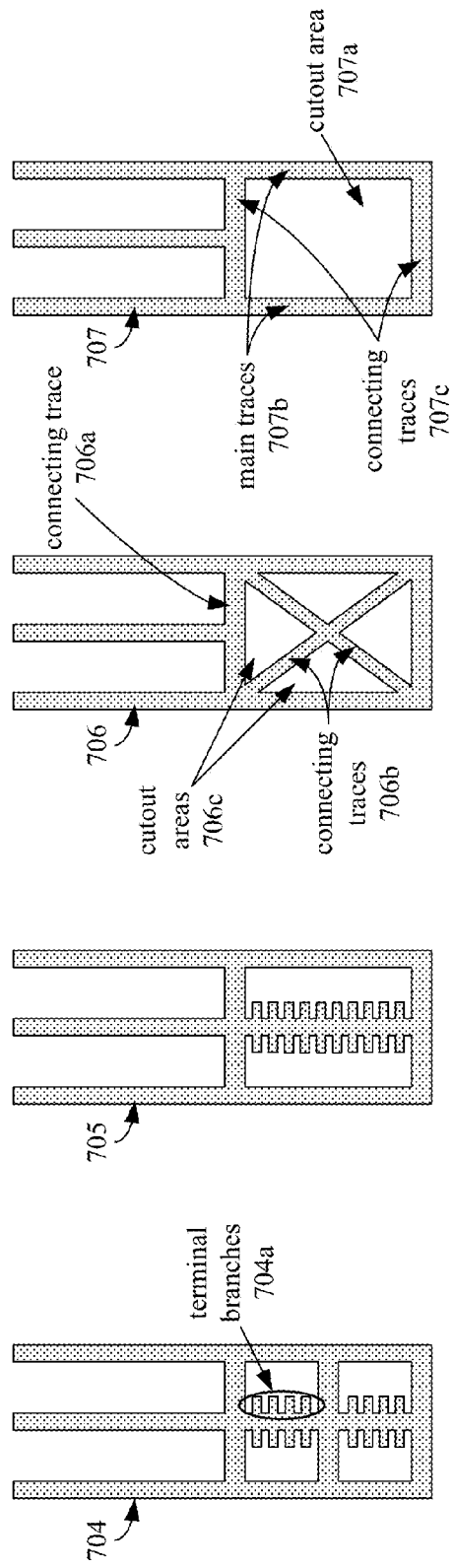
FIG. 7A FIG. 7B FIG. 7C FIG. 7D
FIG. 7E FIG. 7F FIG. 7G FIG. 7H

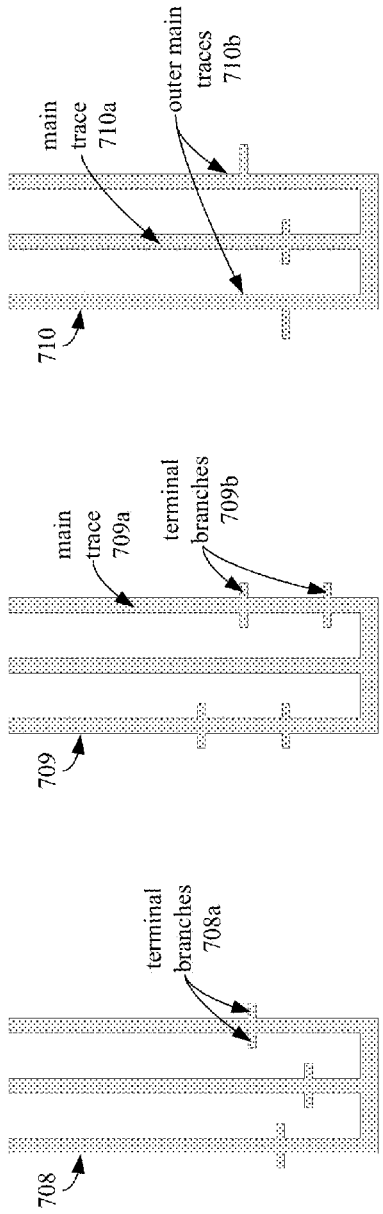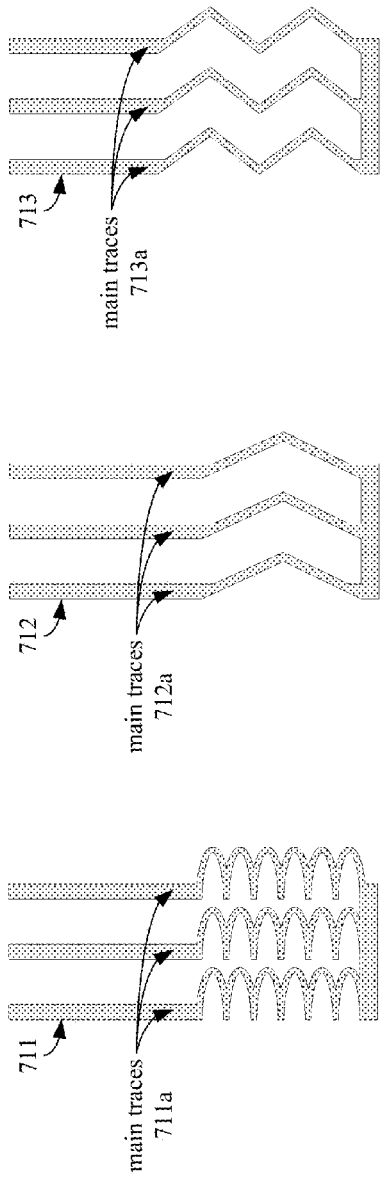

SENSOR ARRAY WITH EDGE PATTERN

RELATED APPLICATIONS

This application claims priority to U.S. Provisional Application No. 61/672,992, filed on Jul. 18, 2012, which is hereby incorporated by reference.

TECHNICAL FIELD

This disclosure relates to the field of touch-sensors and, in particular, to trace patterns of electrodes in capacitive touch-sensor arrays.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor electrodes that detect the position of one or more conductive objects, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

FIGS. 7A-7N illustrate various embodiments of trace patterns for a sensor electrode of a capacitive sensor array.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

In one embodiment, a capacitive sensor array having intersecting row and column sensor electrodes may be constructed such that the electrodes have a different pattern of conductive material in a first region than in a second region. For example, a region that includes the corners and edges of the sensor array may have a different pattern than a region that includes the core of the sensor array.

In one embodiment, each region may be composed of a number of unit cells, which each correspond to a pair of sensor electrodes including a row sensor electrode and a column sensor electrode. The unit cell thus identifies an area of the capacitive sensor array where the mutual capacitance between the pair of electrodes may be affected by a finger or other conductive object proximate to the surface of the sensor array. In one embodiment, the pattern of conductive material making up the portions of the sensor electrodes within one of the unit cells in a first region may differ from a pattern of conductive material making up portions of the sensor electrodes within an adjacent unit cell in a different region.

In one embodiment, a capacitance sensor coupled with a capacitive sensor array as described above may be used to scan the capacitive sensor array by measuring the self capacitances associated with each sensor electrode, or the mutual capacitances between pairs of sensor electrodes. The capacitance sensor may then transmit the measured capacitance values to a host, where the capacitance values may be further processed to determine, for example, locations of fingers or other conductive objects near or touching the surface of the capacitive sensor array. In one embodiment, the host compensates for the capacitance differences between the regions having different patterns of conductive traces.

Figure 1:
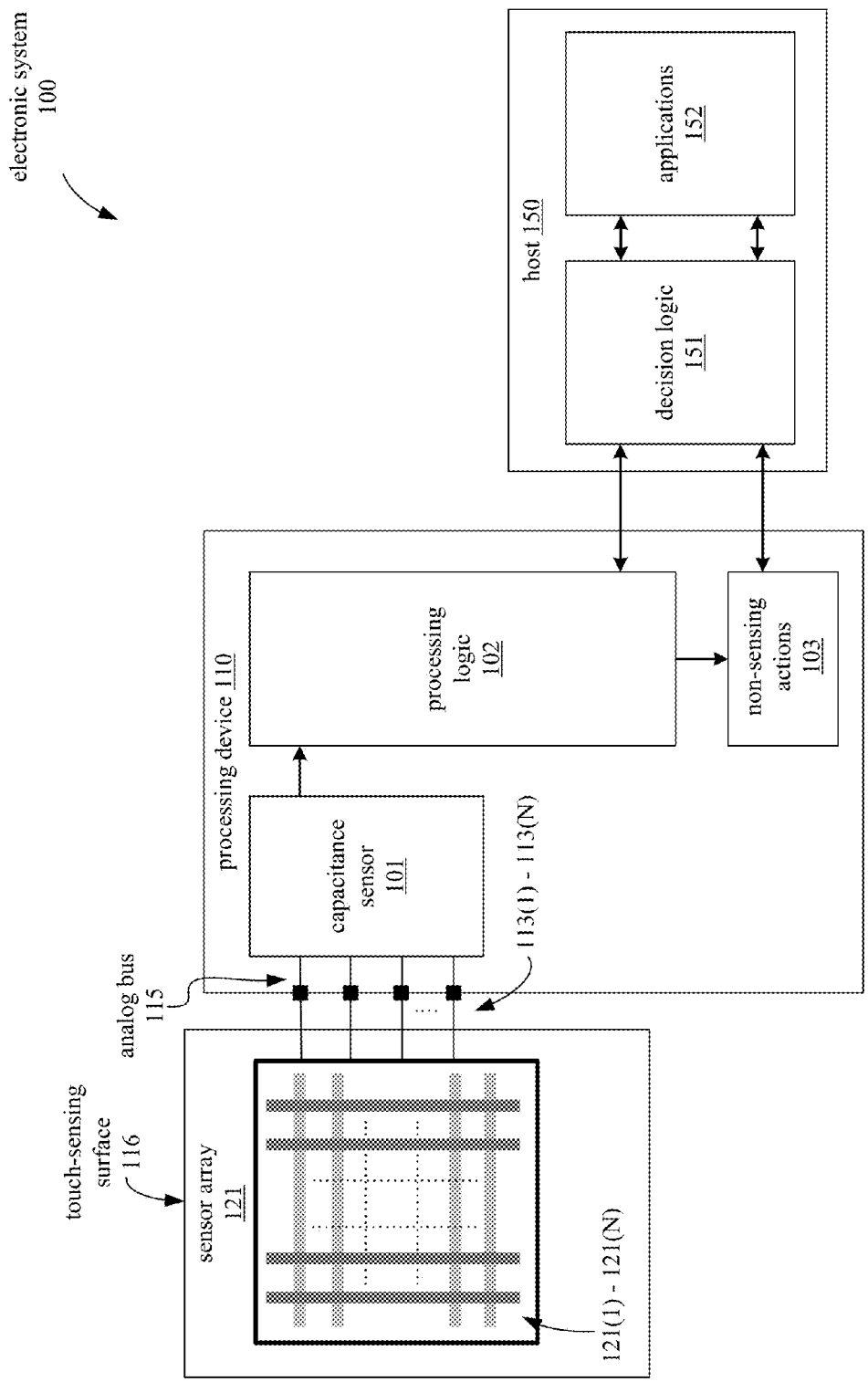
FIG. 1 is a block diagram illustrating an embodiment of an electronic system that processes touch sensor data.

FIG. 1 illustrates a block diagram of one embodiment of an electronic system 100 including a processing device 110 that may be configured to measure capacitances from a touch sensing surface 116 including a capacitive sensor array as described above. The electronic system 100 includes a touch-sensing surface 116 (e.g., a touchscreen, or a touch pad) coupled to the processing device 110 and a host 150. In one embodiment, the touch-sensing surface 116 is a two-dimensional user interface that uses a sensor array 121 to detect touches on the surface 116.

In one embodiment, the sensor array 121 includes sensor electrodes 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In this embodiment, each sensor electrode 121(1)-121(N) is represented as a capacitor.

In one embodiment, the capacitance sensor 101 may include a relaxation oscillator or other means to convert a capacitance into a measured value. The capacitance sensor 101 may also include a counter or timer to measure the oscillator output. The processing device 110 may further include software components to convert the count value (e.g., capacitance value) into a sensor electrode detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), where the object is detected on the sensor array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
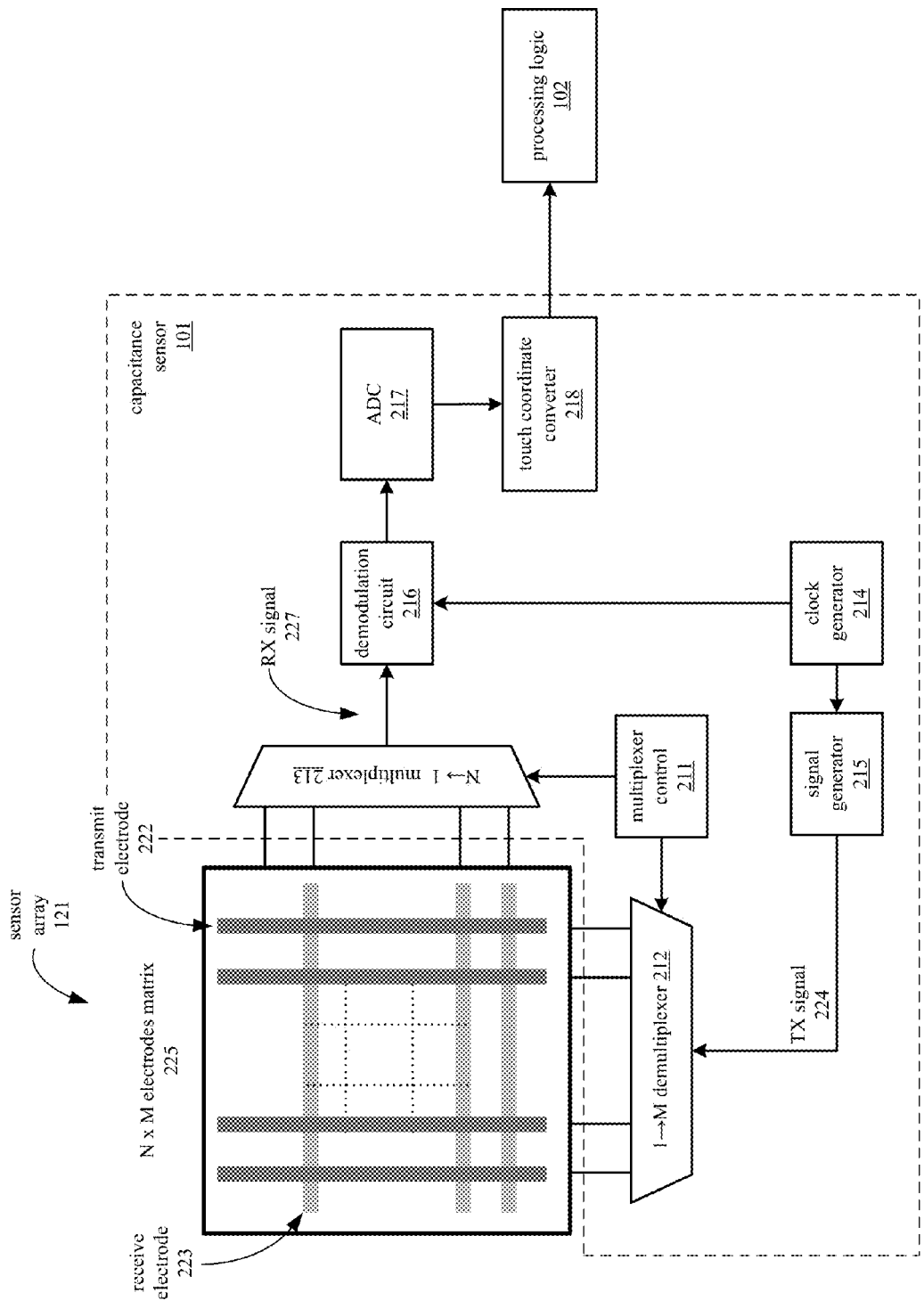
FIG. 2 is a block diagram illustrating an embodiment of an electronic system that processes touch sensor data.

FIG. 2 is a block diagram illustrating one embodiment of a capacitive touch sensor array 121 and a capacitance sensor 101 that converts changes in measured capacitances to coordinates indicating the presence and location of touch. The coordinates are calculated based on changes in measured capacitances relative to the capacitances of the same touch sensor array 121 in an un-touched state. In one embodiment, sensor array 121 and capacitance sensor 101 are implemented in a system such as electronic system 100. Sensor array 220 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 201 through demultiplexer 212 and multiplexer 213.

Capacitance sensor 101 includes multiplexer control 211, demultiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 may be implemented in the processing logic 102.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of touch sensor 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with demultiplexer 212, which allows the TX signal 224 to be applied to any of the M transmit electrodes of touch sensor 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied. In an alternate embodiment the TX signal 224 may be presented in a true form to a subset of the transmit electrodes 222 and in complement form to a second subset of the transmit electrodes 222, wherein there is no overlap in members of the first and second subset of transmit electrodes 222.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with each intersection between a TX electrode and an RX electrode can be sensed by selecting every available combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When an object, such as a finger, approaches the electrode matrix 225, the object causes a change in the measured mutual capacitance between only some of the electrodes. For example, if a finger is placed near the intersection of transmit electrode 222 and receive electrode 223, the presence of the finger will decrease the charge coupled between electrodes 222 and 223. Thus, the location of the finger on the touchpad can be determined by identifying the one or more receive electrodes having a decrease in measured mutual capacitance in addition to identifying the transmit electrode to which the TX signal 224 was applied at the time the decrease in capacitance was measured on the one or more receive electrodes.

By determining the mutual capacitances associated with each intersection of electrodes in the matrix 225, the presence and locations of one or more conductive objects may be determined. The determination may be sequential, in parallel, or may occur more frequently at commonly used electrodes.

In alternative embodiments, other methods for detecting the presence of a finger or other conductive object may be used where the finger or conductive object causes an increase in measured capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined based on the locations of one or more electrodes at which a change in measured capacitance is detected.

The induced current signal 227 is integrated by demodulation circuit 216. The rectified current output by demodulation circuit 216 can then be filtered and converted to a digital code by ADC 217.

A series of such digital codes measured from adjacent sensor or intersections may be converted to touch coordinates indicating a position of an input on touch sensor array 121 by touch coordinate converter 218. The touch coordinates may then be used to detect gestures or perform other functions by the processing logic 102.

In one embodiment, the capacitance sensor 101 can be configured to detect multiple touches. One technique for the detection and location resolution of multiple touches uses a two-axis implementation: one axis to support rows and another axis to support columns. Additional axes, such as a diagonal axis, implemented on the surface using additional layers, can allow resolution of additional touches.

Figure 3A:
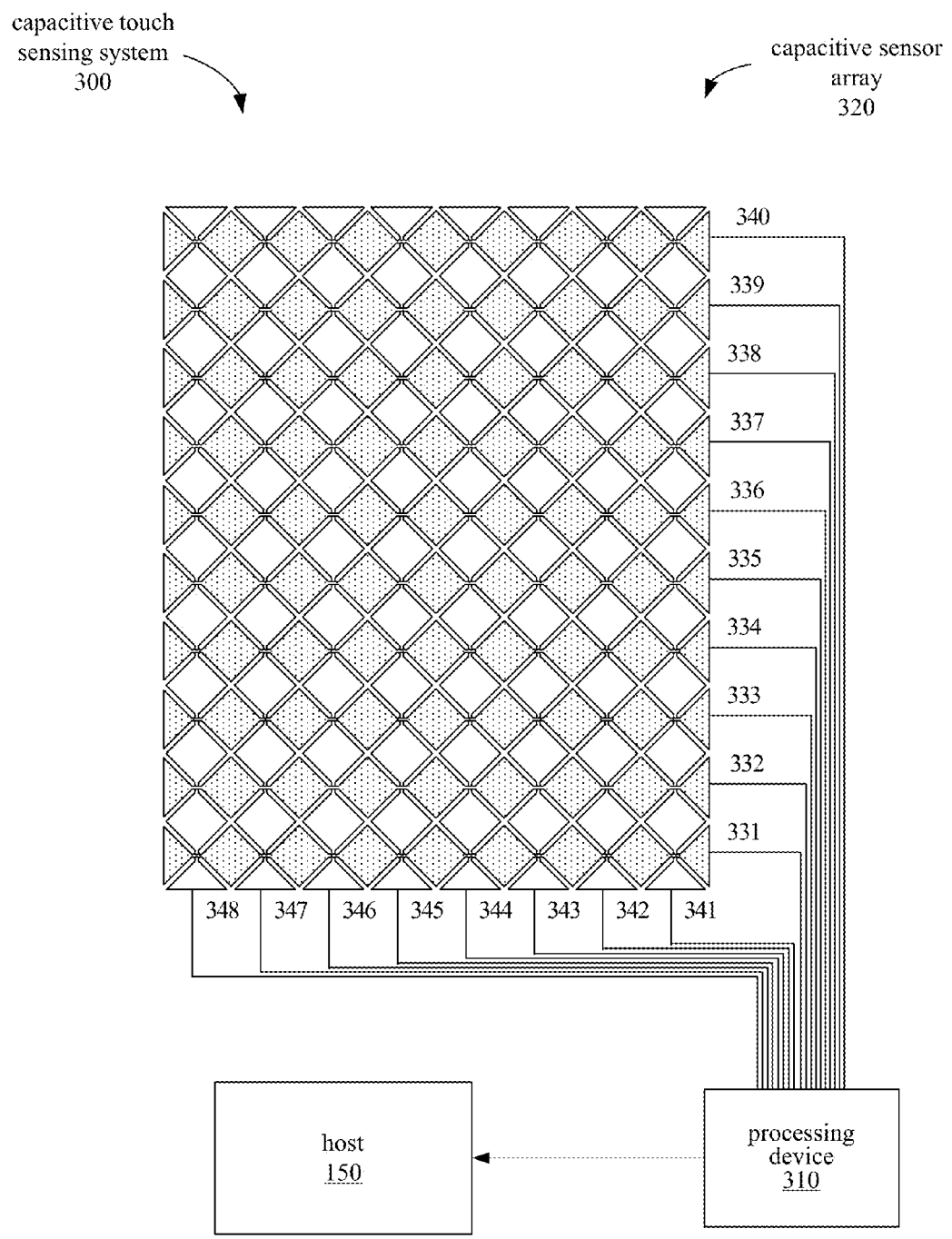
FIG. 3A illustrates an embodiment of an electronic touch-sensing system using a dual solid diamond capacitive sensor pattern.

FIG. 3A illustrates an embodiment of a capacitive touch sensing system 300 that includes a capacitive sensor array 320. Capacitive sensor array 320 includes a plurality of row sensor electrodes 331-340 and a plurality of column sensor electrodes 341-348. The row and column sensor electrodes 331-348 are connected to a processing device 310, which may include the functionality of capacitance sensor 101, as illustrated in FIG. 2. In one embodiment, the processing device 310 may perform TX-RX scans of the capacitive sensor array 320 to measure a mutual capacitance value associated with each of the intersections between a row sensor electrode and a column sensor electrode in the sensor array 320. The measured capacitances may be further processed to determine higher resolution locations of one or more contacts at the capacitive sensor array 320.

In one embodiment, the processing device 310 is connected to a host 150 which may receive the measured capacitances or calculate high precision locations from the processing device 310.

Figure 3B:
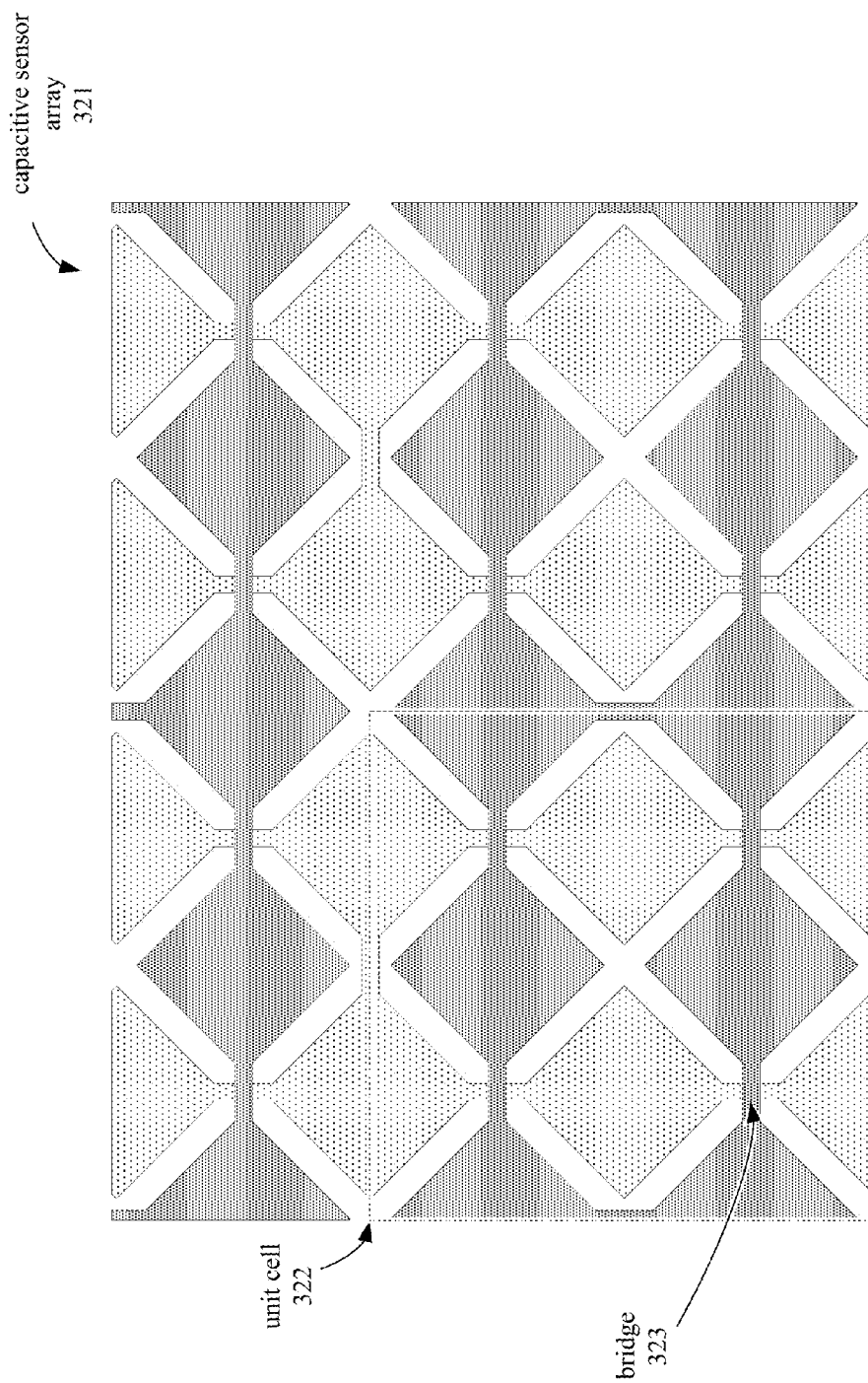
FIG. 3B illustrates an embodiment of a dual solid diamond capacitive sensor pattern.

The sensor array 320 illustrated in FIG. 3A includes sensor electrodes arranged in a diamond pattern. Specifically, the sensor electrodes 331-348 of sensor array 320 are arranged in a single solid diamond (SSD) pattern. FIG. 3B illustrates a capacitive sensor array 321 having an alternate embodiment of the diamond pattern, which is the dual solid diamond (DSD) pattern. Each of the sensor electrodes of capacitive sensor array 321 includes two rows or columns of electrically connected diamond shaped traces. Relative to the SSD pattern, the DSD pattern has improved signal disparity characteristics due to an increase in the coupling between TX and RX sensor electrodes while maintaining the same self-capacitance coupling possible between each sensor electrode and a conductive object near the sensor electrode. The DSD pattern may also provide higher sensitivity for tracking smaller objects, such as the point of a stylus, as compared to patterns having larger features, such as SSD. However, the DSD pattern also increases the number of bridges (such as bridge 323) used to create the pattern, which may result in decreased manufacturing yield. The increased number of bridges may also be visible if metal bridges are used. For example, sensor array 321 includes four bridges within unit cell 322.

Figure 4A:
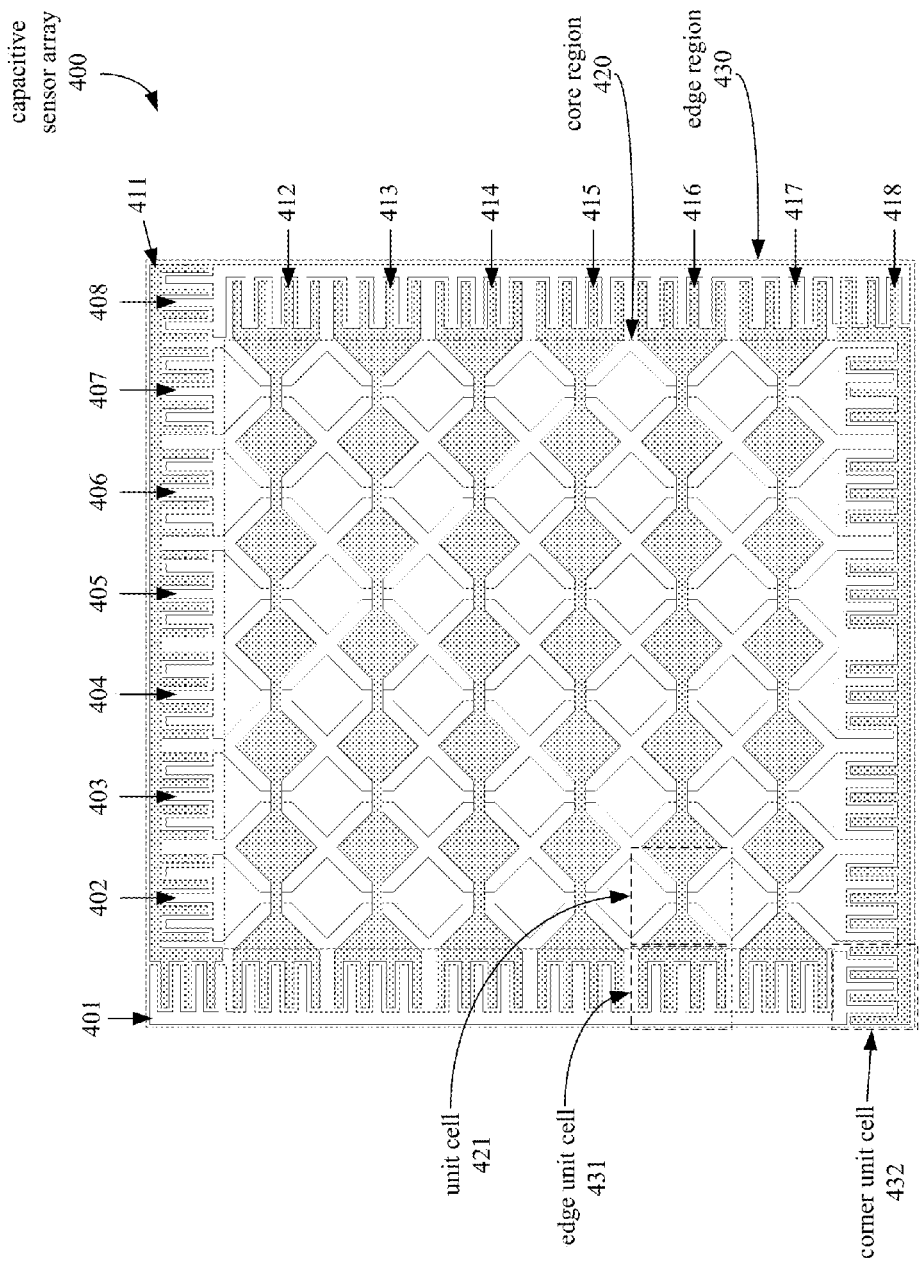
FIG. 4A illustrates an embodiment of a capacitive sensor array.

As illustrated in FIG. 4A, one embodiment of a sensor array may be constructed which has a first region having a diamond pattern, such as a SSD or DSD pattern, and a second region having a pattern different from the diamond pattern. For example, the second region may have a comb pattern.

In one embodiment, the capacitive sensor array 400 may include a first set of column sensor electrodes 401-408 each intersecting with each of a second set of row sensor electrodes 411-418 to form a number of unit cells, such as unit cells 421, 431, and 432. Each of the unit cells corresponds to a pair of sensor electrodes including a row sensor electrode and a column sensor electrode. For example, unit cell 421 corresponds to the pair of sensor electrodes 402 and 416.

In one embodiment, each point within a particular unit cell is nearer to a gap between the corresponding pair of sensor electrodes than to a gap between any other pair including a row and a column sensor electrode. For example, each point within unit cell 421 is nearest to a gap between sensor electrode 402 and sensor electrode 416. Thus, the unit cell 421 encloses an area where a finger or other conductive object may most strongly affect the mutual capacitance between sensor electrodes 402 and 416.

In one embodiment, a first trace pattern within a first unit cell may be different from a second trace pattern within an adjacent unit cell. For example, the trace pattern within the unit cell 431 (which is associated with sensor electrodes 401 and 416) is different from the trace pattern within the adjacent unit cell 421. The trace pattern within each of these unit cells refers to the pattern of conductive material that makes up the portions of sensor electrodes within the unit cells.

In one embodiment, the area of the capacitive sensor array 400 may be divided into regions, where each unit cell in the same region contains substantially the same trace pattern. In one embodiment, at least one of the regions, such as edge region 430, may be located at an edge of the capacitive sensor array 400, while a core region 420 is located at the center of the sensor array 400. In one embodiment, the edge region 430 may partially or completely surround the core region 420, and may include some or all of the unit cells that are located at an edge of the sensor array 400. The edge region 430 includes edge unit cells such as unit cell 431 and corner unit cell 432, which include similar trace patterns.

In one embodiment, the trace patterns within the unit cells of region 430 may resemble two combs having interleaved teeth, with one comb-like trace forming a portion of a row sensor element and the other comb-like trace forming a portion of a column sensor element. This comb pattern substantially differs from the single solid diamond (SSD) pattern of the unit cells within the core region 420, such as unit cell 421.

In one embodiment, the differences between the unit cell trace patterns of the different regions are substantially different; for example, the differences between the trace patterns may be greater than what may be attributable to manufacturing tolerances. In one embodiment, the trace patterns between different regions may differ by other characteristics.

In one embodiment, a first trace pattern of a unit cell in a first region may differ from a second trace pattern of a unit cell in an adjacent region by the number of terminal branches that terminate within the unit cell. Comparing unit cell 431 with unit cell 421, for example, unit cell 431 includes four terminal branches for each portion of sensor electrode within the unit cell 431, which is greater than the number of terminal branches terminating within unit cell 421. In one embodiment, a terminal branch may be considered to be a conductive trace that branches away from a main trace of a sensor electrode and terminates.

In one embodiment, the trace pattern for the first unit cell may have a longer edge length than the trace pattern for the adjacent unit cell. For example, the length of the edges of the traces within unit cell 431 may be longer than the edges of the traces within the adjacent unit cell 421.

In one embodiment, the boundary length between the portions of the sensor electrodes within a first unit cell in the first region may be longer than the boundary length between the portions of the sensor electrodes within a unit cell in the adjacent region. The boundary length between portions of two electrodes may be considered to be the length of the edges of the electrodes that face each other.

In one embodiment, the unit cells in one region may be smaller or larger in area than the unit cells in another region. For example, the edge unit cell 431 may enclose a smaller area than the unit cell 421. In one embodiment, each of the smaller unit cells may be less than or equal to approximately 80% of the size of one of the larger unit cells. For example, each of the cells in the edge region 430 may be 80% of the size, in area, of one of the unit cells in the core region 420.

In one embodiment of a capacitive sensor array, the unit cells in the core may have X and Y dimensions of 5×5 mm, the corner unit cells may have dimensions of 4×4 mm, and 4×5 mm and 5×4 mm for the edges of the sensor along the Y axis and X axis, respectively.

In one embodiment, the geometries of the conductive traces in the unit cells may have other differing characteristics, including but not limited to the average distance between the different sensor electrodes (as seen in unit cells 421 and 431), the area of the conductive material enclosed within the unit cell, or the number of ear or mouth vertexes of the conductive traces within the unit cell.

In one embodiment, the differences between the unit cell trace patterns of the different regions may result in different capacitances between the corresponding pairs of sensor electrodes. For example, a capacitance $C_{M1}$ attributable to the portions of the sensor electrodes within a unit cell in a first region may be greater or less than a capacitance $C_{M2}$ attributable to the portions of the sensor electrodes within a unit cell in a second region due to the different trace patterns within the unit cells. More specifically, the edge unit cell 431 includes portions of sensor electrodes 401 and 416; the capacitance $C_{M1}$ between the portions of electrodes 401 and 416 within the unit cell 431 may be greater than a capacitance $C_{M2}$ between the portions of electrodes 402 and 416, which are within the unit cell 421 in an adjacent region.

In one embodiment, the responsiveness of the unit cell, measured as a change in capacitance $\Delta C_M$ (between a capacitance measured when a conductive object is present and a capacitance measured when a conductive object is not present), may also differ between unit cells in a first region and unit cells in the adjacent region, as a result of different trace geometries in the unit cells. For example, unit cells in an edge region may have a greater $\Delta C_M$ than unit cells in a core region of the capacitive sensor array.

In one embodiment, the unit cells in different regions may, despite having different trace patterns or dimensions, still have similar $C_M$ and $\Delta C_M$ values. In one embodiment, the smaller unit cells, such as those in an edge region, may have $C_M$ or $\Delta C_M$ values that are maximized by the trace pattern to approximate or even exceed the $C_M$ and $\Delta C_M$ values of the unit cells in the core region.

One embodiment of a capacitive sensing system configured to acquire capacitance measurements from the capacitive sensor array 400 may include firmware for compensating for this difference in capacitance for the unit cells in different regions. In one embodiment, this compensation may be accomplished with a baseline compensation scheme, using a table of calculated or empirically determined calibration values.

With reference to FIG. 4A, the terminal branches of the row and column sensor electrodes within the edge region 430 are perpendicular to a near edge of the capacitive sensor array 400. In an alternative embodiment of a capacitive sensor array 450, the terminal branches are parallel to a near edge of the sensor array 450.

In one embodiment, the terminal branches for all unit cells in the edge region may be oriented along the same axis. For example, the terminal branches of all unit cells in the edge region may be parallel to each other, and may be aligned along the X axis, the Y axis, or not aligned to either axis.

With reference to FIG. 4A, the terminal branches of edge electrodes such as electrode 401 and 411 are each connected to a main trace which has a portion within each of the unit cells through which the edge electrode runs. As illustrated in FIG. 4A, the main trace for these edge traces is positioned at the edge of the sensor array 400 so that no part of the edge electrode overlaps a part of another sensor electrode.

Figure 4B:
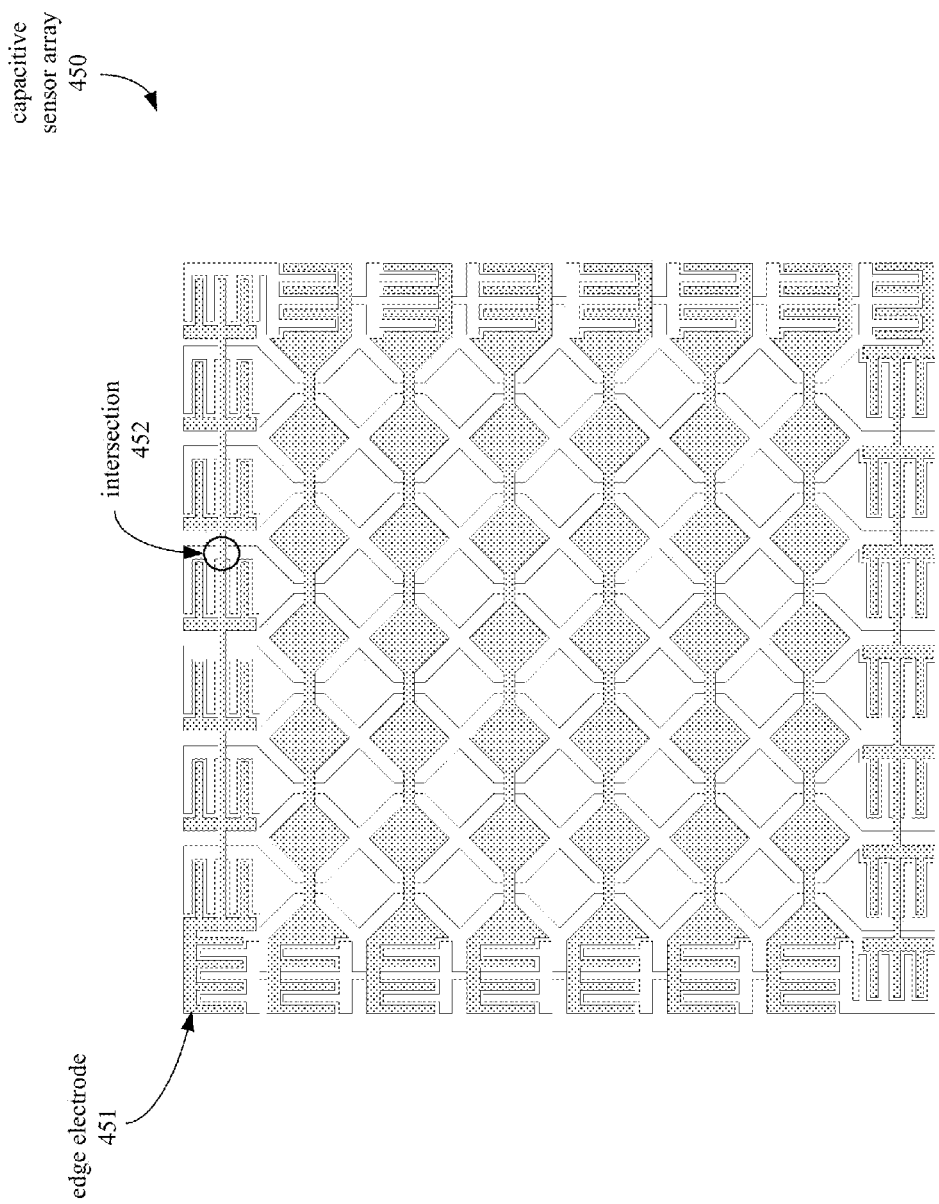
FIG. 4B illustrates an embodiment of a capacitive sensor array.

In contrast, the sensor array 450 in FIG. 4B has edge electrodes with a main trace that is positioned away from the edge of the sensor array 450. Thus, the main traces of the edge electrodes, such as electrode 451, may overlap other sensor electrodes within the unit cells through which the main traces pass, at intersections such as intersection 452. In one embodiment, a bridge may be used to cross over portions of other sensor elements at these intersections.

Figure 5:
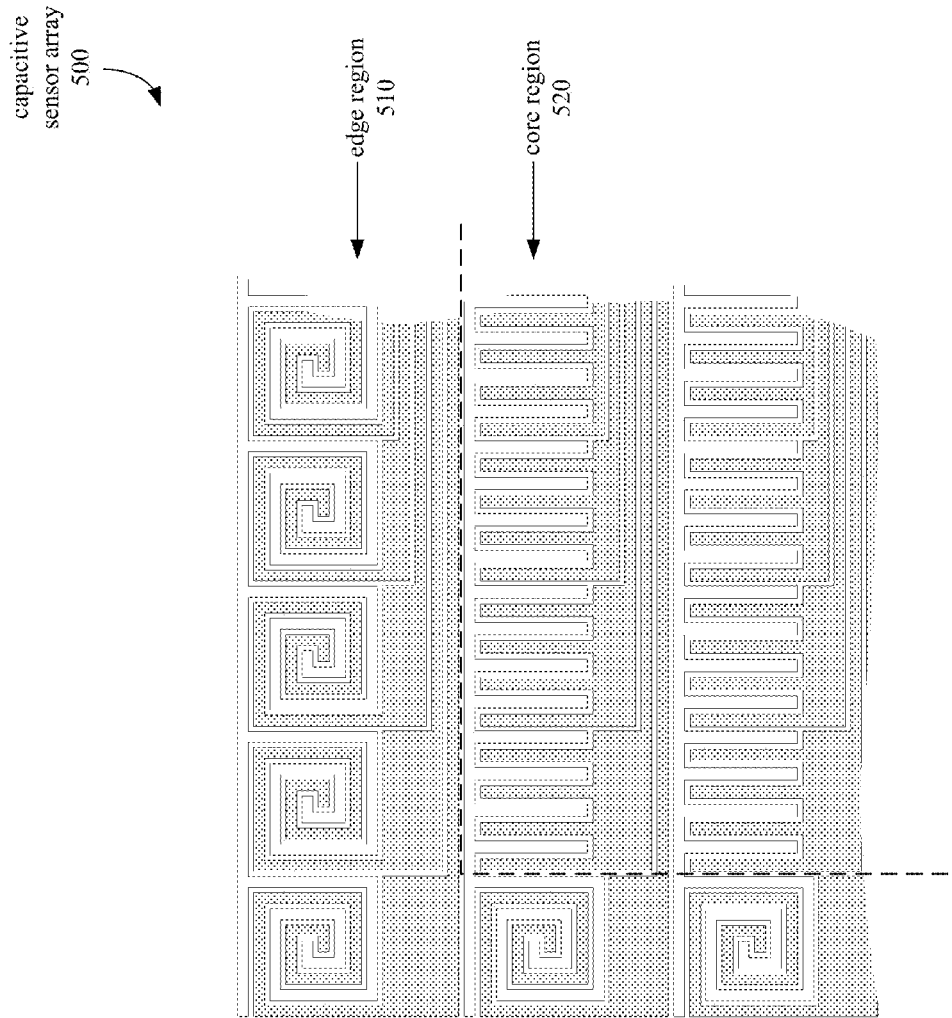
FIG. 5 illustrates an embodiment of a capacitive sensor array.

FIG. 5 illustrates an embodiment of a capacitive sensor array 500 having a core region 520 surrounded by an edge region 510. In one embodiment, the shaded sensor electrodes are transmit (TX) sensor electrodes and the unshaded electrodes are receive (RX) sensor electrodes. The unit cells within the core region 520 have a comb-like trace pattern, where the sensor electrodes in the pair of electrodes corresponding to the unit cell are shaped like combs having interleaved teeth. The unit cells within the edge region 510 have a square spiral pattern, with the electrodes intertwined in a spiral shape. In one embodiment, the $\Delta C_M$ value of each unit cell in the edge region having the spiral shaped trace pattern may be greater than a $\Delta C_M$ value for any of the unit cells in the core region.

In one embodiment, the difference in $C_M$ between the spiral pattern in the edge region and the comb pattern in the core region may be compensated using a baseline compensation scheme. For example, the unit cells in the edge region may have a larger capacitance $C_M$ than the core region unit cells having a comb pattern; thus, a compensation current may be added or subtracted from an integration node to offset the difference in baseline capacitance.

In one embodiment, the dimensions of various parts of the spiral, such as the trace widths and distances between traces may be varied to achieve $C_M$ or $\Delta C_M$ values for the unit cell that are equal to or higher than the $C_M$ or $\Delta C_M$ values for unit cells in the core region 520.

In one embodiment, the unit cells in the core region and the edge region may have different dimensions. For example, the unit cells in the core region 520 may have X and Y dimensions of 5×5 mm, the corner unit cells may have dimensions of 4×4 mm, and 4×5 mm and 5×4 mm for the edges of the sensor along the Y axis and X axis, respectively.

Figure 6:
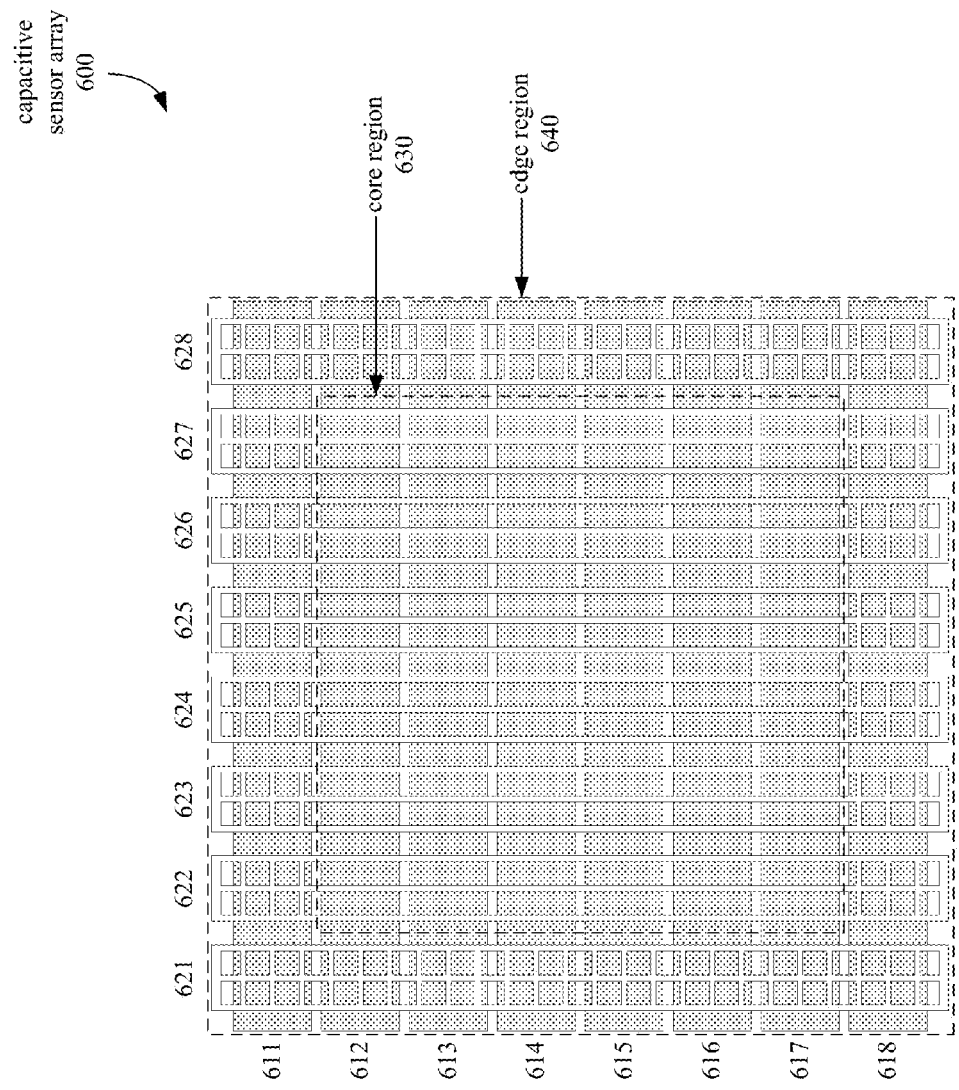
FIG. 6 illustrates an embodiment of a capacitive sensor array.

FIG. 6 illustrates an embodiment of a capacitive sensor array 600 comprising TX row sensor electrodes 611-618 and RX column sensor electrodes 621-628. Each of the row sensor electrodes 611-618 are formed from a single wide rectangular trace. The sensor electrodes 621-628 each include three thinner main traces parallel to each other. Each of the sensor electrodes 621-628 intersects with each of the sensor electrodes 611-618 to form a number of unit cells.

In one embodiment, the shape of the TX electrodes 611-618 performs a shielding function by collectively covering most of the area of the sensor array 600. However, the RX sensor elements 621-628 may still be modified so that unit cells located in different regions contain different trace patterns. For example, the unit cells in the edge region 640 each have a different trace geometry than the unit cells in the core region 630. In one embodiment, the unit cells in the edge region may have additional connecting traces that connect the main traces together in parallel.

FIGS. 7A-7H illustrate various embodiments of trace patterns that may be used to construct sensor elements for capacitive sensor 600, as illustrated in FIG. 6. In one embodiment, any of the trace patterns 700-707 may be used at the ends of the RX sensor electrodes, such as sensor electrode 624.

FIGS. 7A, 7B, and 7C illustrate embodiments of a trace pattern that include a number of cutout areas, or windows formed by connecting traces between main traces of the trace pattern. Trace pattern 701, for example, includes main traces 701b which are connected together by connecting traces 701c. This trace pattern forms cutout areas 701a in the spaces between the main traces 701b and the connecting traces 701c. Trace patterns 700 and 702 also have cutout areas, but may have more or fewer cutout areas formed by correspondingly more or fewer connecting traces.

FIGS. 7D, 7E, and 7F illustrate embodiments of trace patterns that include main traces and connecting traces, similar to trace patterns 700-702, and also include sets of terminal branches extending away from either the connecting traces or the main trace. For example, trace pattern 703 includes three main traces 703b connected by three connecting traces, including connecting trace 703c. Terminal branches 703a extend from connecting trace 703c into the cutout areas formed in the spaces between the main traces 703b and the connecting traces.

In FIG. 7E, trace pattern 704 is similar to pattern 703 except that the terminal branches 704a extend from the central main trace. In FIG. 7F, trace pattern 705 also includes terminal branches that extend from a central main trace, but has fewer connecting traces.

FIG. 7G illustrates an embodiment of a trace pattern that includes triangular cutout areas 706c formed in the space between connecting trace 706a and diagonally oriented connecting traces 706b.

FIG. 7H illustrates an embodiment of a trace pattern that includes a single large cutout area 707a formed in the space between the main traces 707b and connecting traces 707c.

FIGS. 7I-7N illustrate embodiments of trace patterns that, similar to trace patterns 700-707, may be used in constructing the RX sensor electrodes of capacitive sensor array 600.

Trace patterns 708-710 each comprise three main traces, along with terminal branches extending from the main traces. Trace pattern 708 includes two terminal branches, such as branches 708a, extending from either side of each main trace. In one embodiment, the positions of these terminal branches may be staggered. Trace pattern 709 includes three main traces. The outer main traces, such as main trace 709a, are each connected to multiple pairs of terminal branches, such as branches 709b, extending away from the main trace. In trace pattern 710, a pair of terminal branches extend away from the central main trace 710a, while a single terminal branch extends away from one side of each of the outer main traces.

FIGS. 7L-7N illustrate trace patterns where the main traces are formed in wave shapes. Trace pattern 711 includes main traces 711a that are shaped in a half sine wave pattern near the end of the sensor electrode. In trace pattern 712, the main traces 712a each have a single triangular wave pattern, while in trace pattern 713, the main traces 713a each have a double triangular wave pattern.

Figure 8:
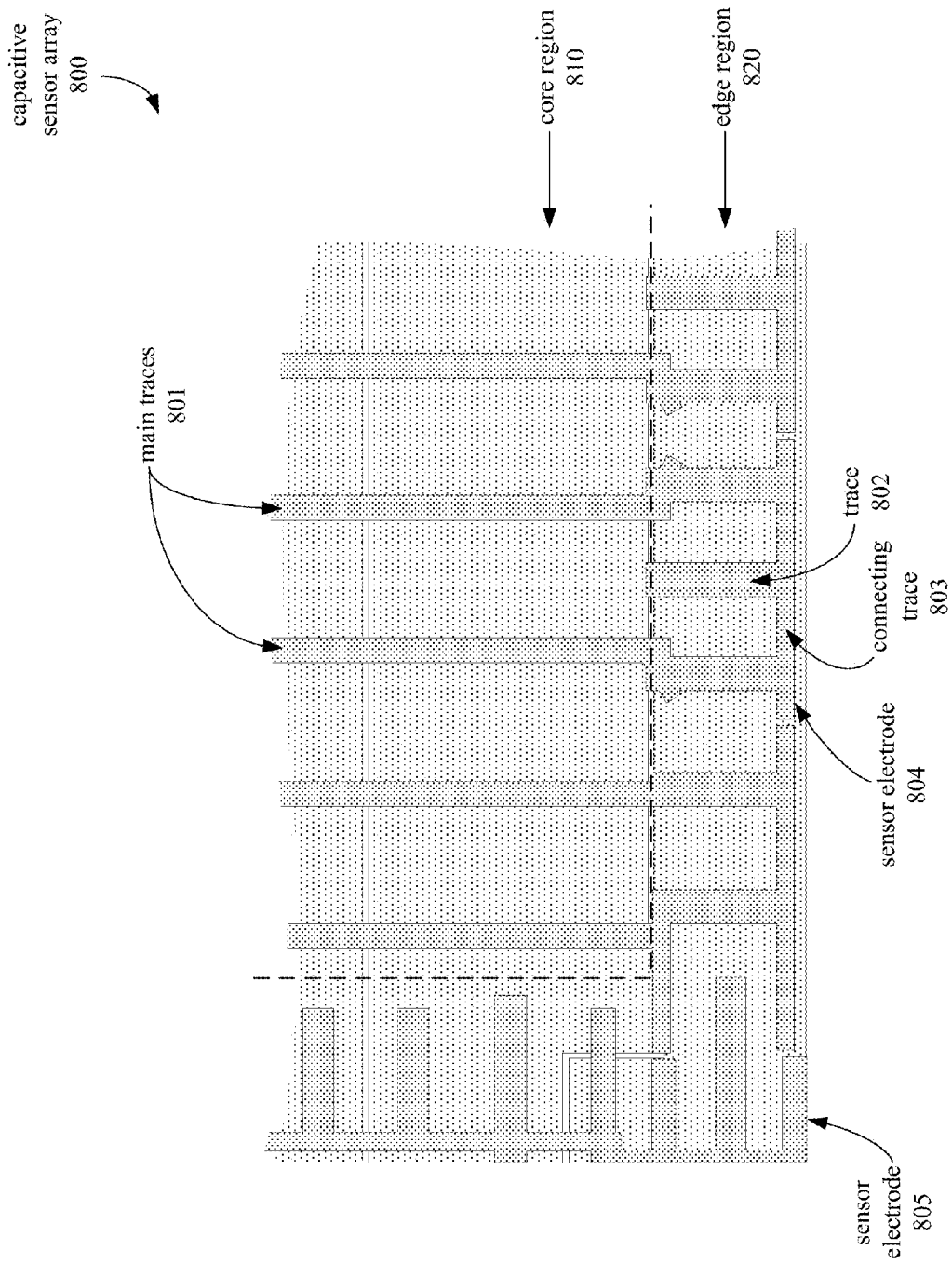
FIG. 8 illustrates a corner portion of a capacitive sensor array, according to an embodiment.

FIG. 8 illustrates an embodiment of a capacitive sensor array 800 having an edge region 820 containing unit cells that are half the size of unit cells in a core region 810. Additionally, two main traces make up the portions of the RX column sensor electrodes in the core region 810, while in the edge region 820, the portions of the RX column sensor electrodes include an additional third trace extending from a connecting trace. For example, the portions of sensor electrode 804 in the core region 810 include the two main traces 801. In the edge region 820, the sensor electrode 804 has an additional trace 802 branching away from the connecting trace 803.

In one embodiment, the widths of the traces in the core region 810 may differ from the widths of the traces in the edge region 810. In one embodiment, the traces in the core region 810 may be 0.4 mm, while the traces in the edge region 820 are 0.55 mm. In one embodiment, the edge region unit cells may have the approximately the same $C_M$ as the core region unit cells. In an alternative embodiment, the edge region unit cells may have a greater $C_M$ than the core region unit cells.

As illustrated in FIG. 8, the RX column sensor electrode 805 may include a number of terminal branches that are perpendicular relative to the traces of other sensor electrodes. Furthermore, in this arrangement, the sensor electrode 805 in the corner unit cell partially overlaps with neighboring unit cells. In one embodiment, the baseline capacitance $C_M$ of the corner cell in the layout may be close to the $C_M$ values for the other unit cells in the sensor array 800.

In one embodiment, the sensor electrode 805 may have a single main trace to connect a number of terminal branches, and this main trace may be located at the edge of the sensor array 800. In one embodiment, since the main trace is at the edge of the sensor array 800, it may be constructed from metal without becoming a conspicuous visual feature. For example, a metal main trace at the edge of the sensor array 800 may be located outside of a visible area if the sensor array 800 is used in an application such as a touch screen display.

Figure 9:
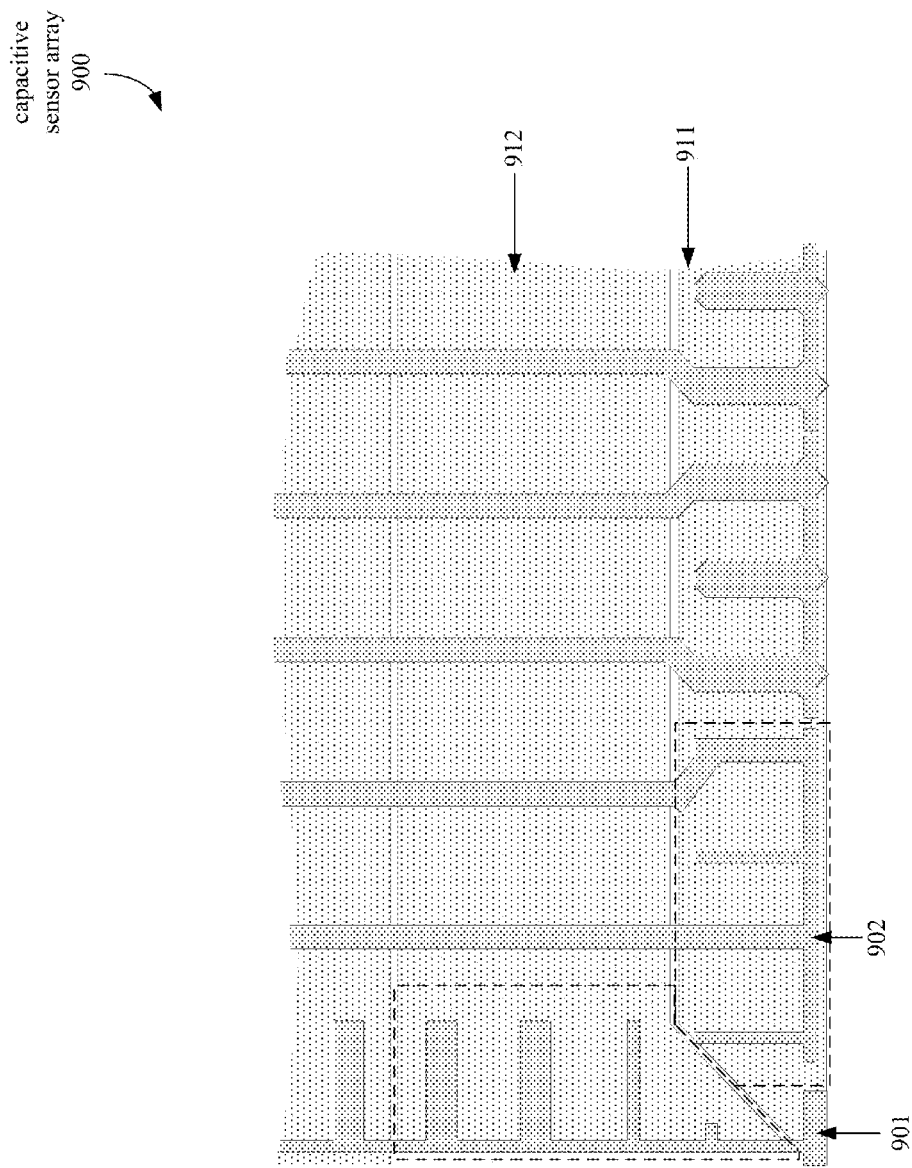
FIG. 9 illustrates a corner portion of a capacitive sensor array, according to an embodiment.

FIG. 9 illustrates an embodiment of a capacitive sensor array 900 which lacks a corner unit cell. In sensor array 900, the majority of the corner area is instead divided along the diagonal between the two adjacent edge unit cells. Thus, a finger or other conductive object in the corner area will affect the mutual capacitances of the electrode pairs 911:902 and 912:901, which are associated with the adjacent edge unit cells nearest to the corner.

Figure 10A:
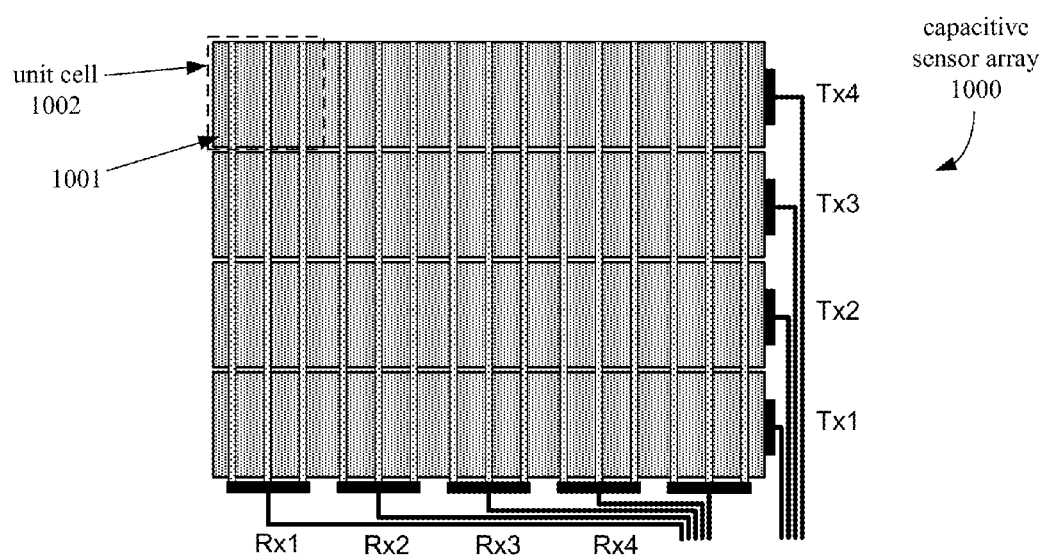
FIGS. 10A-10C illustrate embodiments of a capacitive sensor array.
Figure 10B:
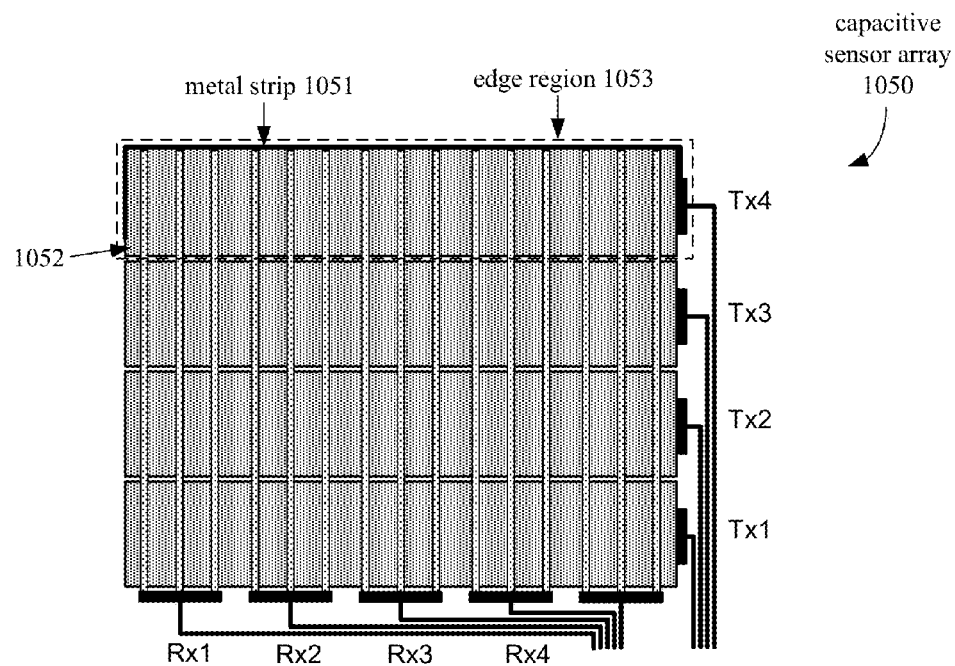

FIGS. 10A and 10B illustrate embodiments of capacitive sensor arrays 1000 and 1050 having three main traces per RX sensor electrode and shielding TX sensor electrodes. In capacitive sensor array 1000, the sensor electrodes may be made purely of ITO; thus, sensor resistance may be higher for the farthest unit cell 1002 than for other unit cells, resulting in a higher RC delay when transmitting or receiving a signal. Reduction of this RC delay may be achieved by decreasing the resistance of the sensor electrodes associated with unit cell 1002.

In one embodiment, capacitive sensor array 1050, illustrated in FIG. 10B, may include sensor electrodes which are primarily made from a material such as Indium Tin Oxide (ITO); however, in contrast with the corresponding sensor electrode 1001 of sensor array 1000, the resistance of sensor electrode 1052 may be reduced by including a metal strip running along an edge of the electrode 1052, which is also along the edge of the capacitive sensor array 1050. In this location, the metal strip 1051 may be located outside a visible area of the sensor array 1050, for example, if the capacitive sensor array 1050 is used in a touch screen display. Thus, the trace pattern for the unit cells in the edge region 1053 differ from the trace patterns of unit cells in other regions, which do not include the metal strip.

Figure 10C:
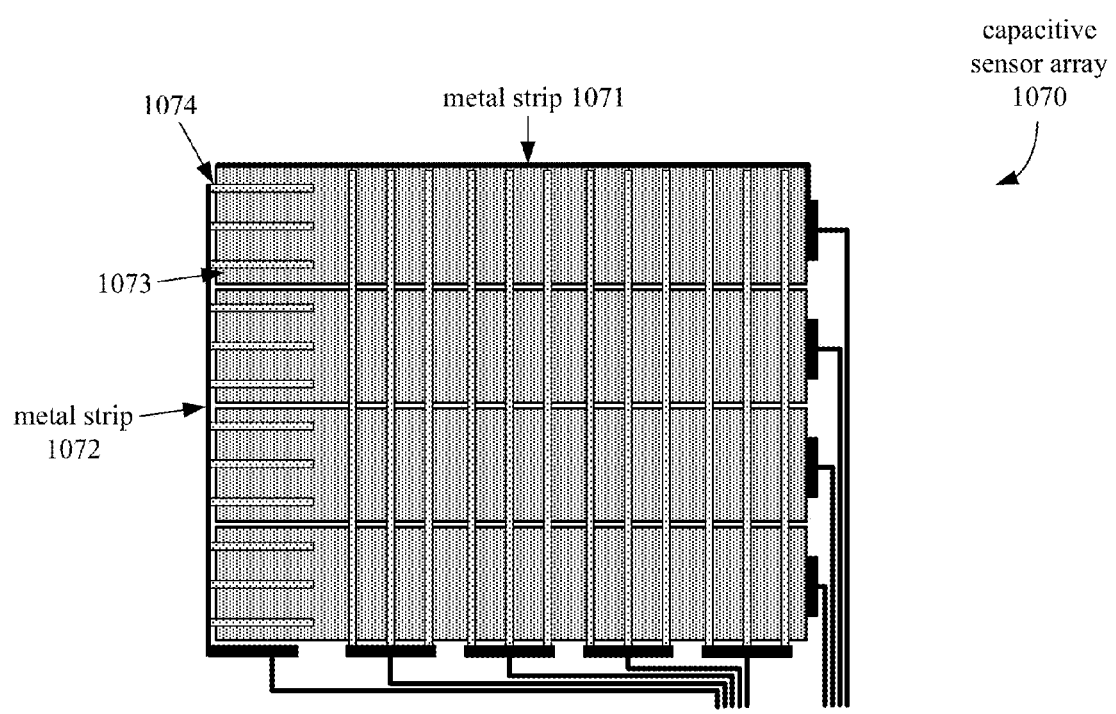

In one embodiment, a metal strip may be applied to sensor electrodes in both the X and Y directions, as illustrated in FIG. 10C. The TX sensor electrode 1071 includes a metal strip 1071 at the edge of the sensor array 1070, while the RX sensor electrode also includes a metal strip 1072 along another edge of the sensor array 1070. In one embodiment, the metal strip 1072 electrically connects portions of the sensor electrode 1074. In one embodiment, the metal strips in sensor arrays 1050 and 1070 may reduce the resistance of the sensor electrodes to which they are applied. In one embodiment, the metal strips may extend for less than the entire length of the sensor electrode, such that the sensor electrode may be designed to have a specific resistance.

In one embodiment, the application of metal features at an edge of a sensor array may also be applied to a sensor array having a diamond pattern, as illustrated with reference to FIGS. 11A and 11B.

Figure 11A:
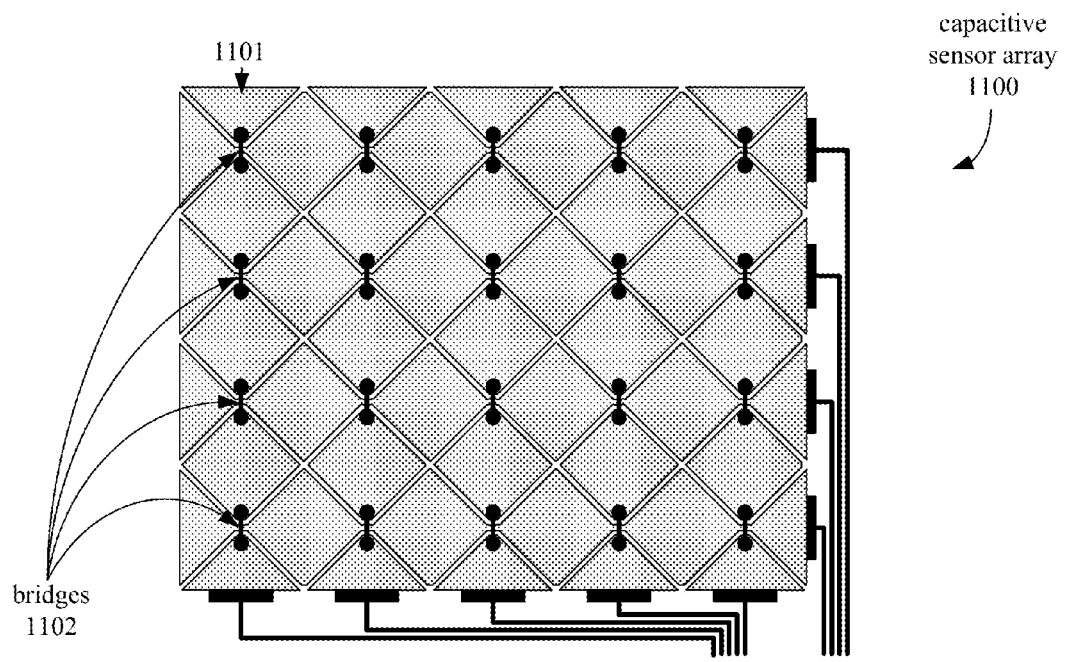
FIGS. 11A and 11B illustrate embodiments of capacitive sensor arrays having a diamond patterns.
Figure 11B:
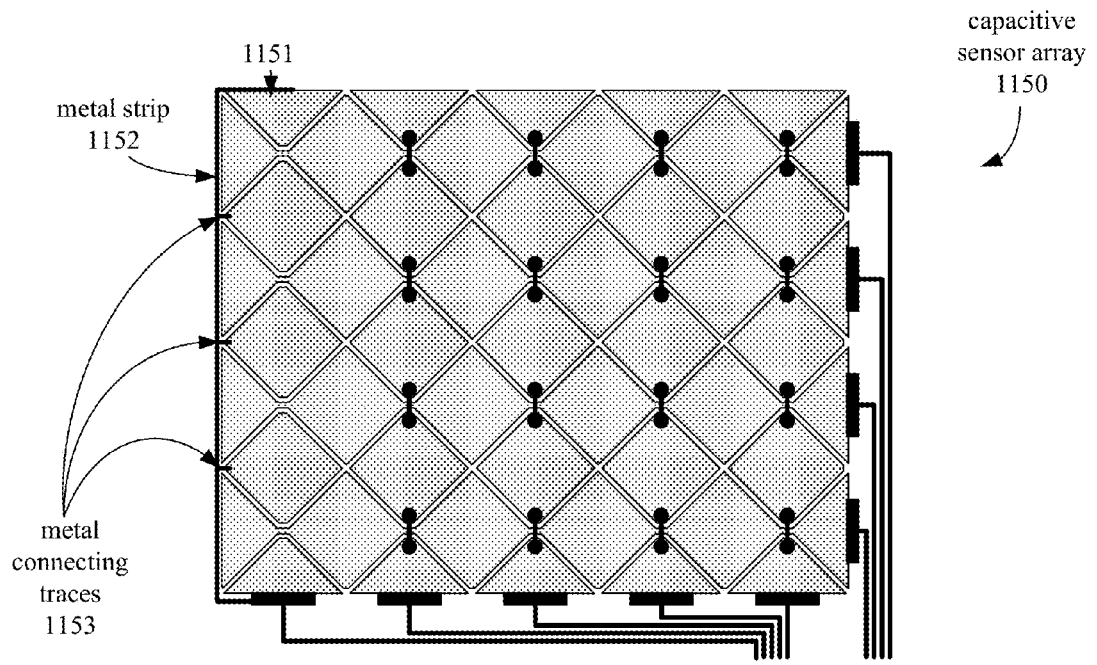

FIG. 11A illustrates a capacitive sensor array 1100, where a sensor electrode 1101 in an edge region of the sensor array 1100 includes five portions that are electrically connected by bridges 1102, which are made from conductive material such as metal. In contrast with sensor electrode 1101, the portions of sensor electrode 1151 in sensor array 1150, as illustrated in FIG. 11B, are connected by a metal strip 1152 and metal connecting traces 1153, with each of the connecting traces 1153 connecting the metal strip 1152 to one of the portions of the sensor electrode 1151.

Figure 12:
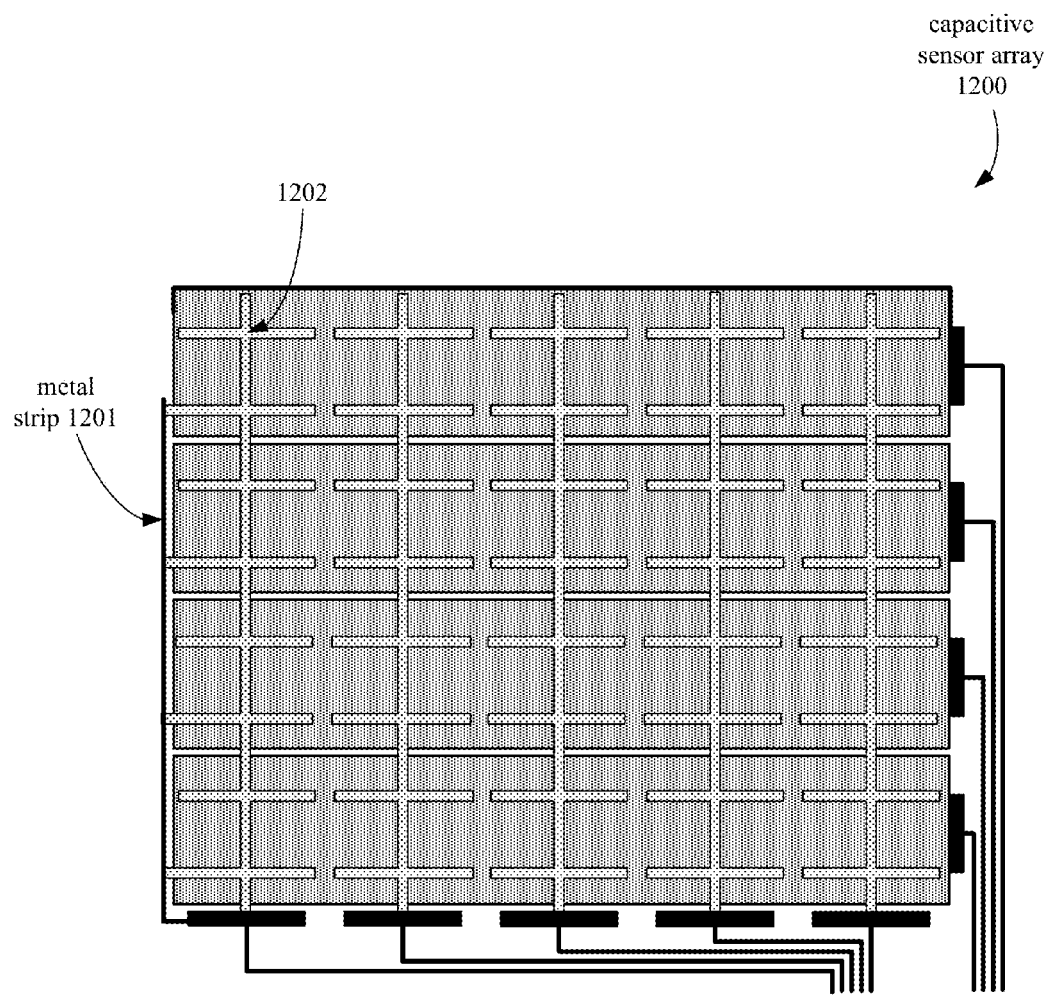
FIG. 12 illustrates an embodiment of a capacitive sensor array having a "totem pole" pattern.

FIG. 12 illustrates an embodiment of a capacitive sensor array 1200 where a metal strip 1201 is used to reduce the resistance of a sensor electrode 1202 having a "totem pole" pattern, with several terminal branches extending away from a single main trace. In one embodiment, the metal strip 1201 may connect to the ends of traces extending from the main trace to provide an additional conductive path for current flowing through the sensor electrode 1202. The metal strip may be located at an edge of the sensor array 1200.

In the foregoing embodiments, various modifications can be made; for example, row sensor electrodes and column sensor electrodes may be interchanged, and row or column sensor electrodes may be used as either TX or RX sensor electrodes. Furthermore, in some embodiments, intersections between row and column sensor electrodes may be replaced with conductive bridges. For example, bridges may be used to electrically connect portions of sensor electrodes when both row and column sensor electrodes are constructed from a single layer of conductive material. As described herein, conductive electrodes that are "electrically connected" or "electrically coupled" may be coupled such that a relatively low resistance conductive path exists between the conductive electrodes.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A capacitive sensor array, comprising:
a first set of sensor electrodes; and
a second set of sensor electrodes, wherein each of the second set of sensor electrodes intersects each of the first set of sensor electrodes to form a plurality of unit cells each corresponding to a pair of sensor electrodes including one of the first set of sensor electrodes and one of the second set of sensor electrodes, wherein a first trace pattern of a first pair of electrodes forming a first unit cell of the plurality of unit cells is different from a second trace pattern of a second pair of electrodes forming an adjacent unit cell of the plurality of unit cells, wherein a first electrode, from the first set of sensor electrodes, is included in the first pair of electrodes to form the first unit cell and in the second pair of electrodes to form the adjacent unit cell, wherein a first shape of the first electrode that forms the first unit cell is different from a second shape of the first electrode that forms the adjacent unit cell, wherein the first unit cell includes a different number of trace branches than the adjacent unit cell, and wherein the first unit cell is nearer than the adjacent unit cell to an edge of the capacitive sensor array.

2. The capacitive sensor array of claim 1, wherein the first unit cell is located at the edge of the capacitive sensor array.

3. The capacitive sensor array of claim 1, wherein the first trace pattern includes a greater number of terminal branches than the second trace pattern.

4. The capacitive sensor array of claim 1, wherein a boundary length between the first pair of electrodes within the first unit cell is longer than a boundary length between the second pair of electrodes within the adjacent unit cell.

5. The capacitive sensor array of claim 1, wherein the edge length of the first trace pattern within the first unit cell is greater than the edge length of the second trace pattern within the adjacent unit cell.

6. The capacitive sensor array of claim 1, wherein a first area of the first unit cell is less than a second area of the adjacent unit cell.

7. The capacitive sensor array of claim 1, wherein a first capacitance between the first pair of electrodes corresponding to the first unit cell is greater than a second capacitance between the second pair of electrodes corresponding to the adjacent unit cell.

8. The capacitive sensor array of claim 1, wherein each unit cell of the plurality of unit cells is an area of the capacitive sensor array such that each point within such area is nearer to a gap between the pair of sensor electrodes corresponding to the unit cell than to a gap between any different pair of sensor electrodes corresponding to any similarly-shaped unit cell.

9. The capacitive sensor array of claim 1, wherein the trace branches are terminal branches.

10. A system, comprising:
a capacitance sensor;
a first set of sensor electrodes coupled with the capacitance sensor; and
a second set of sensor electrodes coupled with the capacitance sensor, wherein each of the second set of sensor electrodes intersects each of the first set of sensor electrodes to form a plurality of unit cells each corresponding to a pair of sensor electrodes including one of the first set of sensor electrodes and one of the second set of sensor electrodes, wherein a first trace pattern of a first pair of electrodes forming a first unit cell of the plurality of unit cells is different from a second trace pattern of a second pair of electrodes forming an adjacent unit cell of the plurality of unit cells, wherein a first electrode, from the first set of sensor electrodes, is included in the first pair of electrodes to form the first unit cell and in the second pair of electrodes to form the adjacent unit cell, wherein a first shape of the first electrode that forms the first unit cell is different from a second shape of the first electrode that forms the adjacent unit cell, wherein the first unit cell includes a different number of trace branches than the adjacent unit cell, and wherein the first unit cell is nearer than the adjacent unit cell to an edge of an area occupied by the first set of sensor electrodes and the second set of sensor electrodes.

11. The system of claim 10, further comprising firmware configured to compensate for a capacitance difference between the first unit cell and the adjacent unit cell.

12. The system of claim 10, wherein the first unit cell is located at an edge of a capacitive sensor array formed by the first set of sensor electrodes and the second set of sensor electrodes.

13. The system of claim 10, wherein the first trace pattern includes a greater number of terminal branches than the second trace pattern.

14. The system of claim 10, wherein the edge length of the first trace pattern within the first unit cell is greater than the edge length of the second trace pattern within the adjacent unit cell.

15. The system of claim 10, wherein a first capacitance between the first pair of electrodes corresponding to the first unit cell is greater than a second capacitance between the second pair of electrodes corresponding to the adjacent unit cell.

16. The system of claim 10, wherein each unit cell of the plurality of unit cells is an area such that each point within such area is nearer to a gap between the pair of sensor electrodes corresponding to the unit cell than to a gap between any different pair of sensor electrodes corresponding to any similarly-shaped unit cell.

17. The system of claim 10, wherein the trace branches are terminal branches.

18. A capacitive sensor array, comprising:
a first plurality of sensor electrodes; and
a second plurality of sensor electrodes, wherein each of the second plurality of sensor electrodes intersects each of the first plurality of sensor electrodes to form a plurality of unit cells each corresponding to a pair of sensor electrodes including one of the first plurality of sensor electrodes and one of the second plurality of sensor electrodes, wherein a first trace pattern of a first pair of electrodes forming a first unit cell of the plurality of unit cells is different from a second trace pattern of a second pair of electrodes forming an adjacent unit cell of the plurality of unit cells, wherein a first electrode, from the first plurality of sensor electrodes, is included in the first pair of electrodes to form the first unit cell and in the second pair of electrodes to form the adjacent unit cell, wherein a first shape of the first electrode that forms the first unit cell is different from a second shape of the first electrode that forms the adjacent unit cell, wherein the first unit cell includes a different number of trace branches than the adjacent unit cell, and wherein a first region including the first unit cell surrounds a second region including the adjacent unit cell.

19. The capacitive sensor array of claim 18, wherein the edge length of the first trace pattern for each unit cell within the first region is greater than the edge length of the second trace pattern for each unit cell within the second region.

20. The capacitive sensor array of claim 18, wherein a first area of each unit cell of the first region is less than a second area of each unit cell within the second region.

21. The capacitive sensor array of claim 18, wherein the first region is located at an edge of the capacitive sensor array.

22. The capacitive sensor array of claim 21, wherein the first region is located at a corner of the capacitive sensor array.

23. The capacitive sensor array of claim 18, wherein portions of a sensor electrode within the first region are electrically connected at an edge of the capacitive sensor array.

24. The capacitive sensor array of claim 18, wherein each unit cell of the plurality of unit cells is an area of the capacitive sensor array such that each point within such area is nearer to a gap between the pair of sensor electrodes corresponding to the unit cell than to a gap between any different pair of sensor electrodes corresponding to any similarly-shaped unit cell.

* * * * *